United States Patent [19]

Donley et al.

[11] Patent Number: 5,761,446
[45] Date of Patent: Jun. 2, 1998

[54] LIVELOCK AVOIDANCE

[75] Inventors: Greggory D. Donley, Sunnyvale; Manoj Gujral, Santa Clara, both of Calif.

[73] Assignee: Unisys Corp, Blue Bell, Pa.

[21] Appl. No.: 518,353

[22] Filed: Jun. 14, 1995

[51] Int. Cl.⁶ .................................................. G06F 13/14
[52] U.S. Cl. ........................... 395/287; 395/292; 395/730; 395/200.56
[58] Field of Search ................................... 395/287, 292, 395/200.53, 200.55, 200.56, 674, 728, 730

[56] References Cited

U.S. PATENT DOCUMENTS 5,650,997  7/1997  Yang et al. ............................ 370/448

*Primary Examiner*—Jack B. Harvey
*Assistant Examiner*—Jeffrey K. Seto
*Attorney, Agent, or Firm*—Mark Starr; John McCormack

[57] ABSTRACT

In a multiprocessor computer system where a number of "agents" can compete for access to a "resource", a method of ameliorating "Livelock" and preventing any such agent from being unduly frustrated from such access, this method comprising: arranging the system to include an arbitrating unit and a common system bus connecting a number of processors, plus an Avoidance unit included in each processor and including a Random-Number generator and automatic "Random Backoff" that causes an agent that fails to secure access to wait for one or more given random time periods $T^B$ before reattempting such access, with each said time period $T^B$ being provided by the random number generator so as to likely differentiate from competing agents.

8 Claims, 3 Drawing Sheets

LIVELOCK AVOIDANCE

This relates to cache control means in a computer, and particularly to means for avoiding "Livelock".

BACKGROUND, FEATURES

In many multiprocessor computer systems, control of the addressing unit is important, likewise for related cache control elements. An exemplary multiprocessor is depicted in FIG. 1, with a number of processor boards (B-1 thru B-N) all similar and coupled to a system bus mb (SCM, or synchronous coherent memory bus), along with an Arbiter Unit 2. Main memory M and I/O interfaces (ST10 and open system 10 to respective bus means). Each board B is similar and includes a local processor P (e.g., Pentium by Intel Corp.), cache memory C, a cache controller cc (comprising a Data stage DU coupled to cache c, and Address stage AU, coupled to processor P, with each stage coupled to bus mb by a respective bus), plus a pair of Tag memory units (pref RAM): a P-tag coupled to processor P and Address unit AU, and a B-tag, also coupled to AU. With such separate addressing and data units (and their buses) this may be called a "split transactions" type processor board.

Arbitration for access to the SCM bus is provided by an arbiter ASIC #2. Arbiter 2 ensures "fairness" by granting requests for access to SCM address busses and data busses in round robin fashion: i.e., whereby any requesting agent is guaranteed access to a bus after waiting no longer than one prior access by other competing agents. Such an "agent" may be a local processor; such bus access may be desired by an agent in order to use a system "resource" that other agents are competing for (e.g., the resource may be main memory, I/O lines or another processor—quite commonly one processor wants to use another processor, or its cache memory).

Due to lack of resources, the agent which is the target of a request made by an address unit AU, or any other SCM agent, may have the request "retried", whereby the target indicates that the requester should re-issue his request at a later time—whereupon the resource initiates a RETRY (—the requester is thus said to have been "retried"). In such a case, arbiter 2 (FIG. 1) will not be aware that the requesting agent (now "retried") has forfeited its access to the system bus SCM, so it will lower this agent's priority, forcing it to wait until all other devices have been serviced before it can retry its transaction.

In certain situations a condition called "livelock" can occur; i.e., when the system bus transaction patterns frustrate access by a "livelocked agent": i.e., such an agent is retried because a resource is unavailable, then this resource becomes available but is captured by a different agent, so this "Retried-agent" re-acquires the SCM bus only to find that the target resource is, again, unavailable; so it must, again, RETRY. In some cases this pattern can re-occur indefinitely and cause "starvation" of a repeatedly-retried agent: such is called "system livelock".

One approach to preventing system livelock would be to provide a "backoff mechanism" whereby an agent waits a predetermined time before re-arbitrating for the bus in the hope this will give the requested resource time to become available. In some cases, however, "backoff" alone, may not be sufficient to prevent "livelock".

Our invention addresses this problem, and provides two other unique solutions to address "livelock". The first solution is a "random backoff" mechanism which causes the AU to wait a "random" time period $t_b$ before rearbitrating for the system bus, then going direct to Resource request.

The second solution is a "stretch" mechanism which enables the AU to immediately arbitrate for the system bus, and then, once access is granted, wait some "random" time period $t_s$ before attempting to use the resource. This prevents other agents from accessing the resource, while allowing time for the resource to become available. In common these solutions provide that the delay time during such a "backoff", or during such a "stretch", is random, with the delay $t_b$ for Backoff preceding bus-request, but delay $t_s$ for stretch occurring after bus-request (bus-capture), and before Resource request. Workers will note that either $t_b$ or $t_s$ can build-in system delays, but $t_s$ is more serious in that it also ties-up a bus. Thus, a manufacture will select, and test sample $t_s$, $t_b$ numbers and select either, or both Backoff or stretch for a machine.

Now, these delay times, according to our invention, are made "random", rather than one or several prescribed delay times, so as to better avoid matching the related times of competing agents; also, they are repeatedly invoked—each time with a different, i.e., random, delay—so as to better avoid (accidentally) matching the periodicity of other agents. For example, if another competing agent re-attempts to capture the desired bus (resource) every x seconds, the subject agent having a random "retry-time" may retry in x seconds the first time, but then retry in "y" seconds the second time (it being quite unlikely that a random-number generator would issue x on two successive times).

Preferably, the system software will set a "range" of delay times (e.g., see Table I, below—so that the times will be "reasonable" in light of the circumstances, and so they will be closed-ended, and closely-limited; otherwise extended, even unlimited, delay times might result, badly compromising system efficiency). And, preferably, the system software will be "set" (or reset, as desired) to a range of delay-times, while the hardware will automatically generate random values, within this range, and do so repeatedly, until a Retry succeeds.

As a further preferred feature, a minimum-delay, or "offset" will also be prescribed (e.g., by software; see Table I) to assure that some reasonable MIN delay time always elapses (e.g., enough to let a resource free-up—never ZERO delay time!). For example, a "successful" delay-range may be quite hard to predict (to avoid Livelock), so a manufacturer may select a "low" range, low offset initially, and then test to see if Livelock is avoided—if not, these values could be adjusted (increased) until the system is successful. Such adjustments can also be made "in the field" (e.g., with a software "patch").

Thus, an object hereof is to address "system livelock", especially with a "backoff" solution. A related object is to do so via "random backoff". Another related object to do so via a "stretch" mechanism, especially "random stretch". A further object is to implement such "random backoff" and/or "random stretch" mechanisms with addressing means which is adapted to generate the related random number (delay), especially where this is done with a linear feedback shift register, providing a "pseudo-random sequence". A related object is to do this also using control means adapted for selection of "window range" (width) and "offset" values used to generate a random backoff/random stretch count, programmed to provide a delay range which can resolve "livelock" and also enhance system performance. A further object is to address the problems here mentioned and to provide related features and advantages.

Other objects and advantages of the present invention will be apparent to those skilled in the art.

BRIEF DESCRIPTION OF THE DRAWINGS

The foregoing and other features and advantages of the present invention will be appreciated by workers as they become better understood by reference to the following detailed description of the present preferred embodiments, these being considered in conjunction with the accompanying drawings, wherein like reference symbols denote like elements:

FIG. 1 is a very schematic, idealized showing of a multiprocessor computer for illustrating livelock problems; while

DETAILED DESCRIPTION OF PREFERRED EMBODIMENTS

Figure 1:
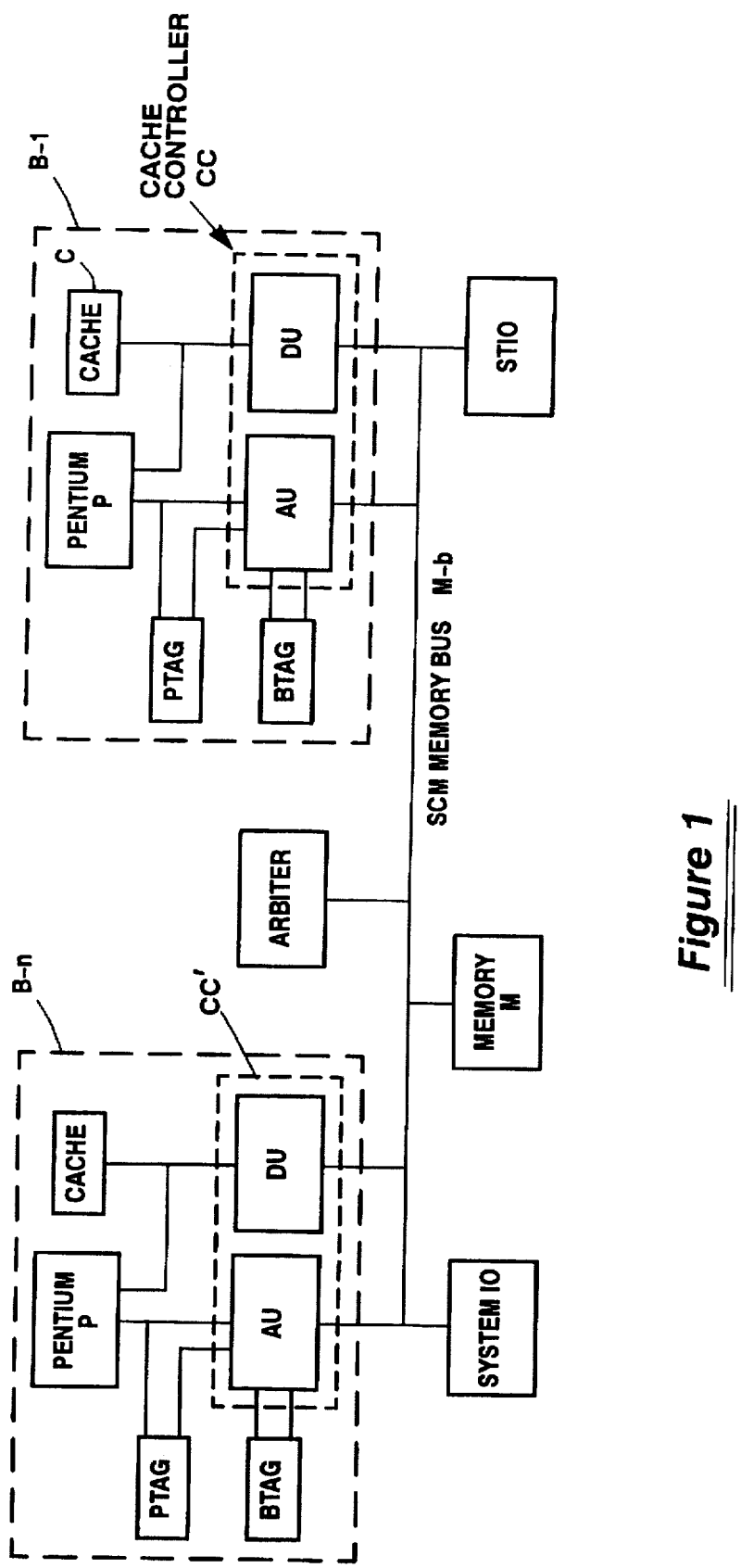
Figure 2:
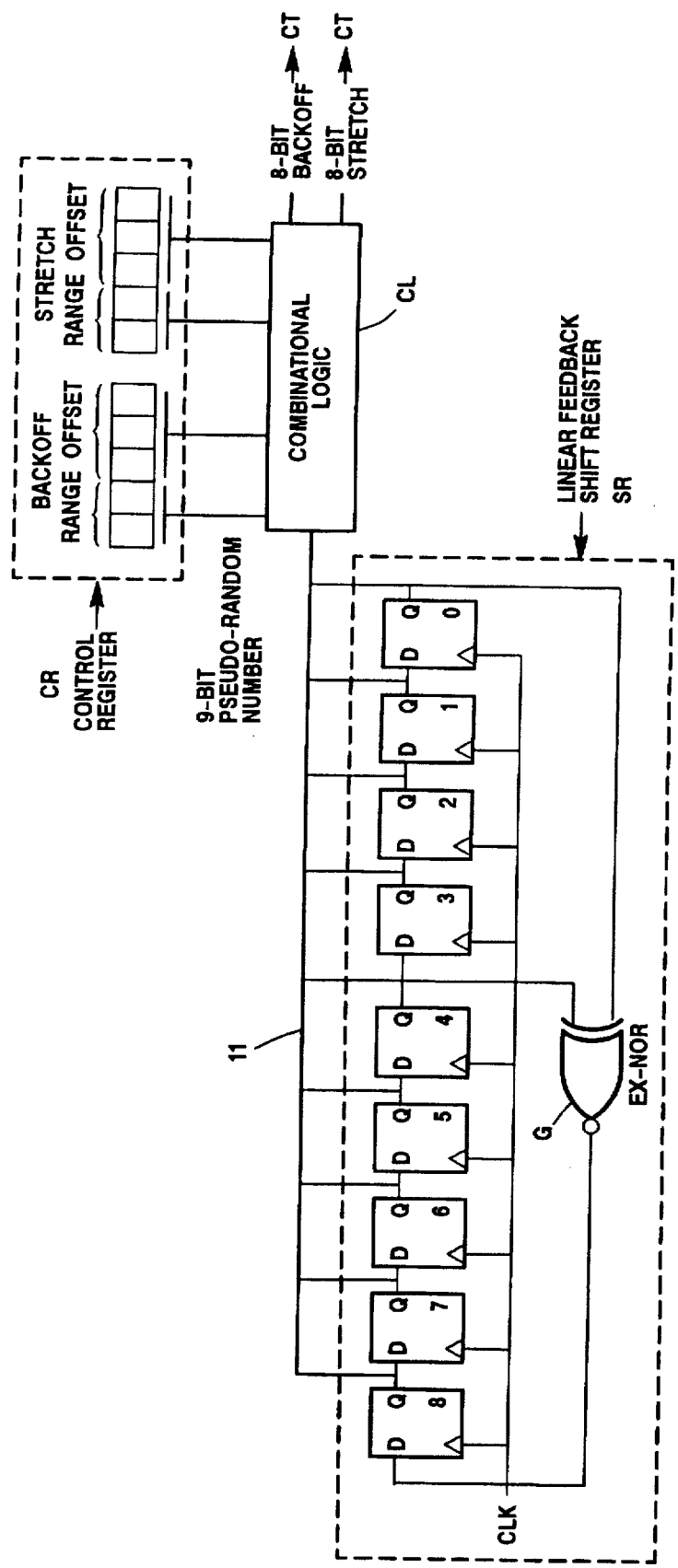
FIG. 2 illustrates, in block diagram form, a modification of salient control functions, in an address unit of a processor such as indicated in FIG. 1,—this for addressing "Livelock" according to a preferred embodiment of the invention.

As mentioned, FIG. 2 illustrates how an Address unit (e.g., as in FIG. 1, and known in the art) may be modified—according to a preferred embodiment—to include control means (e.g., Control Register CR), "random number generator" means (e.g., Linear feedback shift register SR) and related output means (e.g., combinational logic unit CL, backoff counter, stretch counter, etc.). This allows a given processor array to so implement the desired "random backoff" and "random stretch" mechanisms (delay times): both "Livelock Avoidance" (LA) mechanisms preferably incorporated for each local processor array.

Here, while other means may be used to provide such "random backoff" and/or "random stretch" mechanisms, we prefer to use unique, modified address unit (AU) structure (e.g., of each processor array in FIG. 1) adapted to generate the random number (delay time) for the AU backoff or stretch. For this, the AU uses a linear feedback shift register (see SR, FIG. 2) to provide a "pseudo-random sequence", while a 5-bit control register (CR, FIG. 2) is used to select a "window range" and "offset" which are then used to generate the random backoff/stretch count. This allows the AU to be programmed with a "delay range" which optimize both livelock avoidance and system performance.

The random number for such backoff/stretch delay is preferably generated by a 9-bit pseudo-random number generator which provides a repeating 9-bit sequence every 511 clocks. Such a period (511 clock beats) should be long enough to prevent any retry pattern from developing on the bus—after which the 9-bit sequence will repeat. This random number generator is implemented as shown in FIG. 2 by Linear Feedback Shift Register SR, as fed by Control Register CR and suitable Combinational Logic stage CL. Register SR comprises nine (9) flip-flops (#0 thru #8) in series, and sharing input from Control bus 11 and the common clock CLK, plus a feedback from #4 and #0 via EX-NOR gate G.

Figure 3:
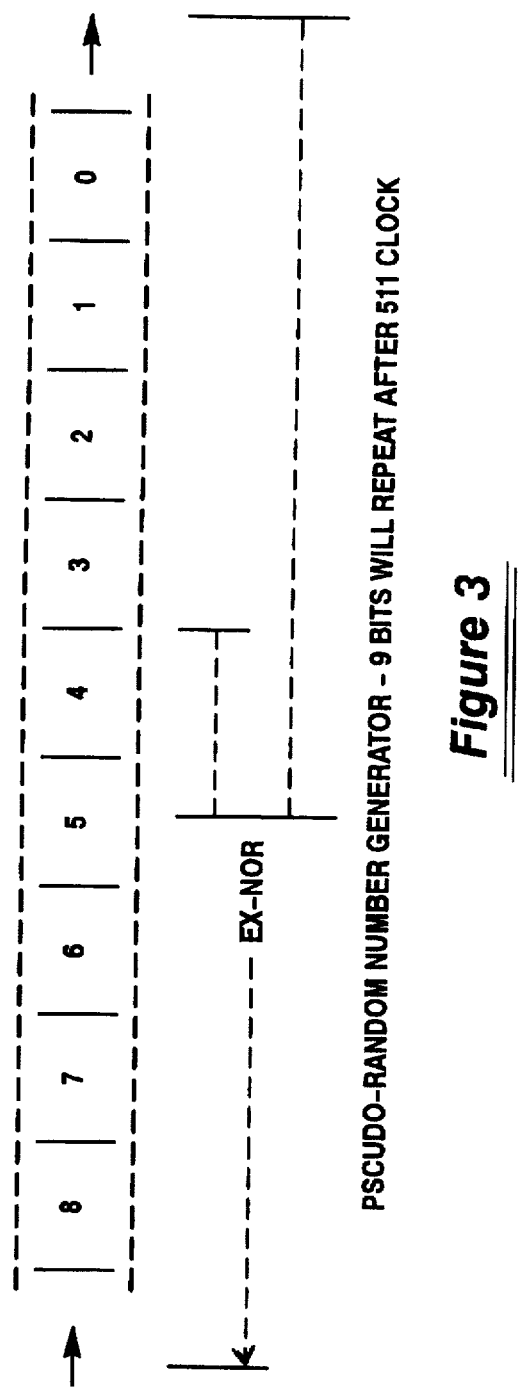
FIG. 3 is a related block diagram illustrating operation of a preferred shift register embodiment, as a "pseudo-random number generator.

This random number generator will work as follows (also see FIG. 3):

In FIGS. 2, 3, the "pseudo-random Number Generator" (e.g., SR) comprises a series of nine (9) flip-flops (#0–#8) sharing a common clock—such that, on each rising clock edge, each flip-flop will assume the value of the preceding flip-flop. The first flip-flop assumes the value of the feedback circuit: here, simply the Exclusive-NOR (EX-NOR) gate presenting output values of flip-flops #4 and #0 as in FIG. 2. The nine bits in FIG. 3 will repeat after 511 clocks.

The random number (issued to CL, thence to the backoff or stretch counters) is controlled by two control fields in an internal QCTL register (in the AU, see CR in FIG. 2), one field for backoff, the other for stretch as FIG. 2 shows. Each of these fields is composed of two subfields; a "range sub-field" and an "offset" sub-field. A 2-bit "range width" sub-field specifies the range of random numbers that may be generated (also see Range width in Table I), while a 3-bit "range offset" register specifies an "offset", (number—also see Table I) that will be added to each random number to derive a final random "stretch" value or random "backoff" value (delay time)—this being generated from the linear feedback register SR, and the range and offset fields by combinational logic unit CL.

The number issued from CL will be an 8-bit number (8-bits being sufficient to represent the maximum "random backoff/random stretch" value, or 183 as seen in Table I below), and will be issued to both a backoff means and a stretch means, and will represent a prescribed unit of (system-clock) time.

Whenever a "retry" occurs and is unsuccessful, and the random backoff and/or random stretch mechanisms are enabled, the 8-bit value output (backoff delay $t_b$, and stretch delay $t_s$) by CL is loaded into an associated counter ($t_s$ to backoff CTR and $t_s$ to stretch CTR', see FIG. 2). Each counter is then decremented by ONE on each clock pulse from the system clock. When the counter reaches ZERO, the backoff/stretch period is said to have expired, and the system allows the agent to then request the desired resource.

The Table I below indicates sample, preferred "range width" and "offset" values for each combination of bits in the aforementioned range and offset fields, as well as the resulting random number range: (Note: the Random Number Generator will be controlled to issue a number RN that is output to the backoff counter CTR and to the stretch counter, CTR'—doing so repeatedly until RETRY succeeds—each time a different RN):

TABLE I

| | Range Width | | | |
|---|---|---|---|---|
| Offset | 16(00) | 32(01) | 64(10) | 128(11) |
| 4(000) | 4–19 | 4–35 | 4–67 | 4–131 |
| 8(001) | 8–23 | 8–39 | 8–71 | 8–135 |
| 16(010) | 16–31 | 16–47 | 16–79 | 16–143 |
| 24(011) | 24–39 | 24–55 | 24–87 | 24–151 |
| 32(100) | 32–47 | 32–63 | 32–95 | 32–159 |
| 40(101) | 40–55 | 40–71 | 40–103 | 40–167 |
| 48(110) | 48–63 | 48–79 | 48–111 | 48–175 |
| 56(111) | 56–71 | 56–87 | 56–119 | 56–183 |

The "Range Width" values are selected and encoded as indicated for Control Register CR, FIG. 2 (e.g., note two range bit positions, so in Table I "00" indicates the "first range" value—here 16 units, "01" indicates the "second range" value—here 32 units; etc.; also note the three offset bit positions in CR, so in Table I, "000" indicates a "first offset" —here four, while "001" indicates a "second offset" value—here eight, etc.).

In Table I, also note how a given range width (e.g., "16" or values 0 to 15) is modified, or "offset" "positively", by adding a given offset value (e.g., 4 to 19 for offset=4 and width of 16 units; similarly, range width becomes 8 to 23 for offset of 8 and width of 16 units).

As a further example from Table I, if Range Width is programmed as "32" (2'b 01, or "two-bit, binary" notation "01") and the offset is "40" (3'b 101, or three-bit binary notation: 101), the resultant "random delay" range value becomes 40–71 (add 40 to raw range 0–31) So, register SR will output (successive) delay numbers RN lying in this range i.e., Backoff time delay $t_b$: Stretch delay $t_s$: for counters LTR, CTR', respectively. Thus, logic unit CL would output a random delay number $t_b$ as an 8-bit backoff value to the Backoff Counter CTR (FIG. 2), which would then count-down, as controlled by system clock-pulses (i.e., each clock pulse decrements this Counter, until $t_b$ is reached, then bus-request, is allowed, followed by Resource access)—thus yielding the desired "random backoff" delay, whereby this so-modified AU waits for "random time" $t_b$ and then re-arbitrates for the system bus.

In like fashion, a similar "random stretch count" is produced and fed to counter CTR' as delay $t_s$: this solution enabling the so-modified AU to immediately arbitrate for the system bus, then once "access" is granted, "sit" on it for the so-generated "random time", and then attempt to use the desired resource—meanwhile allowing the resource to, hopefully, become available, and blocking other, competing agents from using the bus.

In the foregoing, workers should preferably assume that each "agent" accessing Register SR, etc. identifies itself with a unique "agent-ID" symbol, and that register SR is "seeded" with all such "agent-ID" numbers, so that each agent will generate a different set of random numbers, and not duplicate those of any other accessing agent (e.g., at least a different "offset" initially).

For example, if the range width is programmed to 32 (2'b01: means the register is programmed with "01" which indicates a range at 32) and the offset is 40 (3'b101: ), then a random delay between 40–71 (clocks) will be generated, (adding the offset (40) to the random number: 0–31).

The combination logic CL generates the random number using the range to generate a "mask" which selects a subset of the 9 bits in the shift register. The offset is then added to this number to generate a final random stretch or backoff value, to be fed to a respective counter CTR, CTR' (FIG. 2).

Of course, whether Backoff or Stretch, or both, is invoked depends on how the machine was set-up (by manufacturer) or later adjusted (by user). And either/both mechanisms are automatically invoked each time a RETRY fails (including repeating foiled RETRYs—the random delay value likely changing each time).

In summary, this, modified Addressing unit, AU, according to the invention, provides ways for avoiding livelock via such novel features as:

1) implementing a "random backoff";

2) implementing "random stretch";

3) combination of 1) and 2);

4) feedback shift register used to generate the random number for 1) and 2);

5) windowing technique used to allow the range of random numbers (delay times) to be programmed.

These features will be found especially apt for use in "split-transaction" systems of the type described, as well as in other similar systems where multiple agents contend for limited resources.

Results

It sill be apparent that any aforedescribed invention is apt for effecting the objects mentioned; e.g., to ameliorate "Livelock"—such as by providing a backoff delay— especially via a random backoff mechanism—and/or by providing an automatic random stretch mechanism. And, while we prefer that this be done by so-modifying the cache control of N processor units in a multi-processor array (e.g., to generate the needed random values), workers will realize that other means may, instead, be employed.

And, many modifications to the preferred embodiment described are possible without departing from the spirit of the present invention, as claimed. For example, there are other ways to provide a random delay time, nor is our claimed invention limited to the particular types of storage or control, or counting means described. As a further example, the offset and range width in our preferred embodiment are described as implemented with a software algorithm, but it is well known that the same functions can be accomplished using known hardware. Additionally, some features of the present invention can be used to advantage without the corresponding use of other features.

Accordingly, the description of the preferred embodiment should be to be considered as including all possible modifications and variations coming within the scope of the invention as defined by the appended claims.

What is claimed is:

1. In a multiprocessor computer system where a number of "agents" can compete for access to a "resource means", a method of ameliorating "Livelock" and preventing any such agent from being unduly frustrated from such access, this method comprising: arranging said system to include arbitrating means and common system bus means connecting a number of processor means, plus Avoidance means included in each said processor means and including Random-Number generating means and automatic "Random Backoff" means that causes a said agent that fails to secure said access to wait for one or more given random time periods $T_B$ before reattempting such access, with each said time period $T_B$ being provided by random number generator means so as to likely differentiate from competing agents; and providing software to select a Range for said random time periods $T_B$; including a prescribed MIN-time, or "offset": and also wherein a Random stretch mechanism is arranged for direct bus-access, after pausing for a random stretch delay, to thereupon attempt Resource access.

2. The method of claim 1, wherein each said processor means is made to include Address means and Data means coupled to split-transaction bus means; and also coupled to SCM Resource means.

3. The method of claim 2, wherein the entire multiprocessor system is mounted on a circuit board means.

4. The method of claim 1, wherein said Avoidance means is automatically invoked whenever a RETRY is unsuccessful; and wherein said Backoff means is arranged to invoke a random delay before bus access is attempted.

5. The method of claim 4, wherein said system includes at least one processor array with cache-control means including said Random Number generating means.

6. The method of claim 5, wherein said system processor array also includes Range-Select means adapted to limit said Random-Number generating means.

7. The method of claim 6, wherein said Range-Select means includes Offset-select means.

8. The method of claim 6, wherein the random numbers are fed to respective Backoff-counter and Stretch counter means, each adapted to count-down under control of clock means, to issue the Backoff and Stretch commands continuing RETRY.

* * * * *